US006820073B1

(12) United States Patent
Bedell et al.

(10) Patent No.: US 6,820,073 B1
(45) Date of Patent: Nov. 16, 2004

(54) SYSTEM AND METHOD FOR MULTIPLE PASS COOPERATIVE PROCESSING

(75) Inventors: Jeffrey A. Bedell, Arlington, VA (US); William Hurwood, Washington, DC (US); Benjamin Z. Li, Great Falls, VA (US); Sadanand Sahasrabudhe, McLean, VA (US); Xinyi Wang, Herndon, VA (US); Jun Yuan, Sterling, VA (US)

(73) Assignee: MicroStrategy Inc., McLean, VA (US)

( * ) Notice: Subject to any disclaimer, the term of this patent is extended or adjusted under 35 U.S.C. 154(b) by 418 days.

(21) Appl. No.: 10/101,488

(22) Filed: Mar. 20, 2002

Related U.S. Application Data

(63) Continuation-in-part of application No. 10/043,285, filed on Jan. 14, 2002, now abandoned, which is a continuation of application No. 09/884,443, filed on Jun. 20, 2001, now abandoned.

(51) Int. Cl.$^7$ ............................................. G06F 17/30
(52) U.S. Cl. .................... 707/2; 707/3; 707/4; 707/10; 709/203
(58) Field of Search ................. 707/3, 5, 6, 9, 707/10, 103 R, 104.1, 2, 4; 706/12; 704/257; 709/203, 217; 703/223; 717/108, 126, 174

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 4,839,853 A | 6/1989 | Deerwester | |
| 5,197,005 A | 3/1993 | Shwartz | |
| 5,261,093 A | 11/1993 | Asmuth | |
| 5,276,870 A | 1/1994 | Shan | |
| 5,418,943 A | 5/1995 | Borgida | |
| 5,421,008 A | 5/1995 | Banning | |
| 5,537,603 A | 7/1996 | Baum | |
| 5,555,403 A | 9/1996 | Cambot | |
| 5,584,024 A | 12/1996 | Shwartz | |
| 5,664,182 A | 9/1997 | Nierenberg | |
| 5,689,698 A * | 11/1997 | Jones et al. ..................... | 707/4 |
| 5,692,181 A | 11/1997 | Anand | |
| 5,787,422 A * | 7/1998 | Tukey et al. .................... | 707/5 |
| 5,864,856 A | 1/1999 | Young | |
| 5,914,878 A | 6/1999 | Yamamoto | |
| 5,918,232 A | 6/1999 | Pouschine | |
| 5,999,927 A * | 12/1999 | Tukey et al. .................... | 707/5 |
| 6,044,366 A * | 3/2000 | Graffe et al. ................... | 707/2 |
| 6,094,651 A | 7/2000 | Agrawal | |
| 6,151,601 A * | 11/2000 | Papierniak et al. ........... | 707/10 |
| 6,154,766 A | 11/2000 | Yost | |
| 6,233,575 B1 * | 5/2001 | Agrawal et al. ................ | 707/6 |
| 6,247,008 B1 | 6/2001 | Cambot | |
| 6,263,334 B1 * | 7/2001 | Fayyad et al. ................. | 707/5 |
| 6,279,033 B1 | 8/2001 | Selvarajan | |
| 6,470,333 B1 * | 10/2002 | Baclawski ...................... | 707/3 |
| 6,484,163 B1 * | 11/2002 | Lawrence et al. ............. | 707/3 |

(List continued on next page.)

OTHER PUBLICATIONS

Gupta, Himanshu et al., "Index Selection for OLAP," IEEE 1063–6382, pp. 208–219.

(List continued on next page.)

Primary Examiner—Shahid Alam
(74) Attorney, Agent, or Firm—Hunton & Williams LLP

(57) ABSTRACT

A system for collaborative processing, comprising a controlling module with access to at least one relational database capable of performing a first set of functions on the data in the database and at least one external analytical engine, the external analytical engine being external to the relational database and being capable of a second set of functions on the data in the database. The controlling module is capable of iteratively processing a multi-step calculation including generating SQL statements to the relational database, passing preliminary results to an external analytical engine and saving data back into the relational database for further processing until the multi-step calculation is performed.

21 Claims, 5 Drawing Sheets

U.S. PATENT DOCUMENTS 6,490,582 B1 * 12/2002 Fayyad et al. .................. 707/6
6,550,057 B1 * 4/2003 Bowman-Amuah ......... 717/126
6,567,797 B1 * 5/2003 Schuetze et al. ............... 707/2
6,598,054 B2 * 7/2003 Schuetze et al. ........ 707/103 R

OTHER PUBLICATIONS

Ho, Ching–Tien et al., "Partial–Sum Queries in OLAP Data Cubes Using Covering Codes," ACM 0–89791–910–6, pp. 228–237.

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp 151–158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu–Based Natural Language Interfaces To Databases, Proceedings of the Ninth International Conference on Very Large Data Bases, Florence, Italy, Oct. 31–Nov. 2, 1983, pp. 43–55.

Craig W. Thompson, John Kolts, and Kenneth W. Ross, A Toolkit for Building "Menu–Based Natural Language" Interfaces, Texas Instruments Incorporated, P. O. Box 226015, MS 238, Dallas, Texas 75265, 1985.

Craig Warren Thompson, M.A., B.A., Using Menu–Based Natural Language Understanding to Avoid Problems Associated with Traditional Natural Language Interfaces to Databases, Dissertation Presented to the Faculty of the Graduate School of the University of Texas at Austin, May 1984.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

GIS/LIS'88 Proceedings accessing the world, vol. 2 pp. 741–750.

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add–In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

SYSTEM AND METHOD FOR MULTIPLE PASS COOPERATIVE PROCESSING

RELATED APPLICATIONS

This application is a continuation-in-part of U.S. application Ser. No. 10/043,285 filed Jan. 14, 2002, entitled "System and method for multiple pass cooperative processing," now abandoned, which is a continuation of U.S. application Ser. No. 09/884,443, filed Jun. 20, 2001 entitled "System and method for multiple pass cooperative processing," now abandoned.

FIELD OF THE INVENTION

The invention relates to the field of data processing, and more particularly to the management of analytic processing against databases to distribute processing tasks to necessary processing resources.

BACKGROUND OF THE INVENTION

The increase in enterprise software, data warehousing and other strategic data mining resources has increased the demands placed upon the information technology infrastructure of many companies, academic and government agencies, and other organizations. For instance, a retail corporation may capture daily sales data from all retail outlets in one or more regions, countries or on a world wide basis. The resulting very large data base (VLDB) assets may contain valuable indicators of economic, demographic and other trends.

However, databases and the analytic engines which interact with those databases may have different processing capabilities. For instance, a database itself, which may be contained within a set of hard disk, optical or other storage media connected to associated servers or mainframes, may contain a set of native processing functions which the database may perform. Commercially available database packages, such as Sybase™, Informix™, DB2™ or others may each contain a different set of base functions. Those functions might include, for instance, the standard deviation, mean, average, or other metric that may be calculated on the data or a subset of the data in the database. Conversely, the analytic engines which may communicate with and operate on databases or reports run on databases may contain a different, and typically larger or more sophisticated, set of processing functions and routines.

Thus, a conventional statistical packages suck as the SPSS Inc. SPSS™ or Wolfram Research Mathematica™ platforms may contain hundreds or more of modules, routines, functions and other processing resources to perform advanced computations such as regression analyses, Bayesian analyses, neural net processing, linear optimizations, numerical solutions to differential equations or other techniques. However, when coupled to and operating on data from separate databases, particularly but not limited to large databases, the communication and sharing of the necessary or most efficient computations may not always be optimized between the engine and database.

For instance, most available databases may perform averages on sets of data. When running averages on data, it is typically most efficient to compute the average within the database, since this eliminates the need to transmit a quantity of data outside the database, compute the function and return the result. Moreover, in many instances the greatest amount of processing power may be available in the database and its associated server, mainframe or other resources, rather than in a remote client or other machine.

On the other hand, the analytic engine and the associated advanced functions provided by that engine may only be installed and available on a separate machine. The analytic engine may be capable of processing a superset of the functions of the database and in fact be able to compute all necessary calculations for a given report, but only at the cost of longer computation time and the need to pass data and results back and forth between the engine and database. An efficient design for shared computation is desirable. Other problems exist.

SUMMARY OF THE INVENTION

The invention overcoming these and other problems in the art relates to a system and method for multipass cooperative processing which distributes and manages computation tasks between database resources, analytic engines and other resources in a data network. While other systems have been capable of processing part of a SQL request in the database and the other part in an analytical engine/process in a single direction manner, various embodiments of the present invention provide for iterative, multi-directional processing of an entire report being processed against the relational database system.

The present invention provides a process for handling multiple steps in a calculation iteratively between a controlling module, a database and an analytical engine external to the database. In this processing environment, some of the calculations or functions to be performed on the data may be performed by the database itself and other calculations or functions may be performed by the external analytical engine. The controlling module resides outside of the relational database receives a report request or other non-SQL request. The controlling module monitors each step in the processing of the report, acting as director over the activities to maximize efficiency and handle complicated multi-sequence calculations so that they do not result in an error.

The controlling module generates the SQL statement needed to be executed against the relational database. Upon generation of the SQL, the controlling module directs a first initial query to the database to resolve one step in the multi-step calculation (e.g., fetching, filtering, calculation or aggregate operations). The controlling module then generates a fetch operation to retrieve the data produced by the initial query outside of the database (and the database's control). The controlling module then passes at least some of the data produced by the initial query to the external analytical engine to perform one or more processing steps on the data. The controlling module then receives the processed results from the external analytical engine and transfers data from that result back into the originating database (e.g., in a database table) or some other database instance. Once in the originating database or the other database instance, the controlling module may direct that further processing occur using the originating database that now includes the data processed by the database and external analytical engine. To do so, the controlling module may generate another SQL statement. That further processing may be done by the database and/or data fetched and provided to the external analytical engine. These steps may continue in any order or sequence and as many times as desired until all of the processes are completed, with the controlling engine generating SQL to perform various calculations or operations. Thus, the present invention allows for multiple levels of nested calculations including calculations that may be performed by the database and those that may be performed by the external analytical engine.

The controlling module then provides the ability to pass the result back the requesting system. Also, the controlling module may direct processing to different databases so that various processes are transmitted to other databases for storage or processing. Thus, in one sequence, data could be retrieved from database A, processed by external analytical engine 1, transmitted to database B, processed with data from database B, transmitted back into database A, processed again by external analytical engine 2, and then passed back to the requester.

In one embodiment of the invention, calculations native to a given database platform nay be trapped and executed in the database, while other types of functions are transmitted to external computational resources for combination into a final result, such as a report executed on the database. In another regard, the invention may permit data including intermediate results to be passed between the computing resources on a cooperative or collaborative basis, so that all computations may be located to their necessary or most efficient processing site. The exchange of data may be done in multiple passes.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
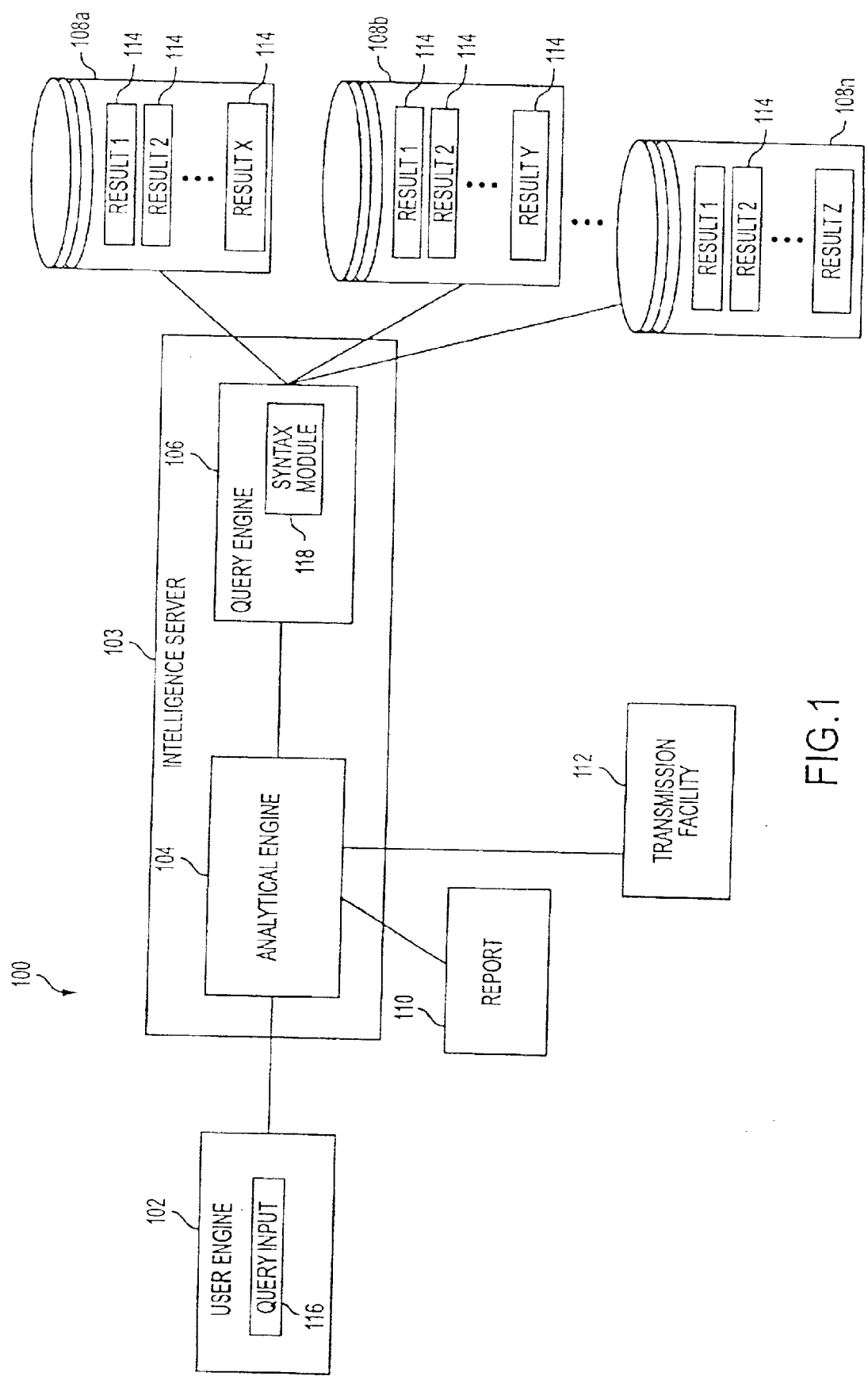
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b ... 108n (where n is an arbitrary number). The data storage devices 108a, 108b ... 108n may include or interface to a relational database or another structured database stored on a hard disk, an optical disk, a solid state device or another similar storage media. When implemented as databases, the data storage devices 108a, 108b ... 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b ... 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a, Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b ... 108n may be supported by a server or another resource and may, in some embodiments, include redundancy, such as a redundant array of independent disks (RAID), for data protection. The storage capacity of any one or more of the data storage devices 108a, 108b ... 108n may be of various sizes, from relatively small data sets to very large database (VLDB)-scale data sets, such as warehouses holding terabytes of data or more. The fields and types of data stored within the data storage devices 108a, 108b ... 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joins or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

Figure 2:
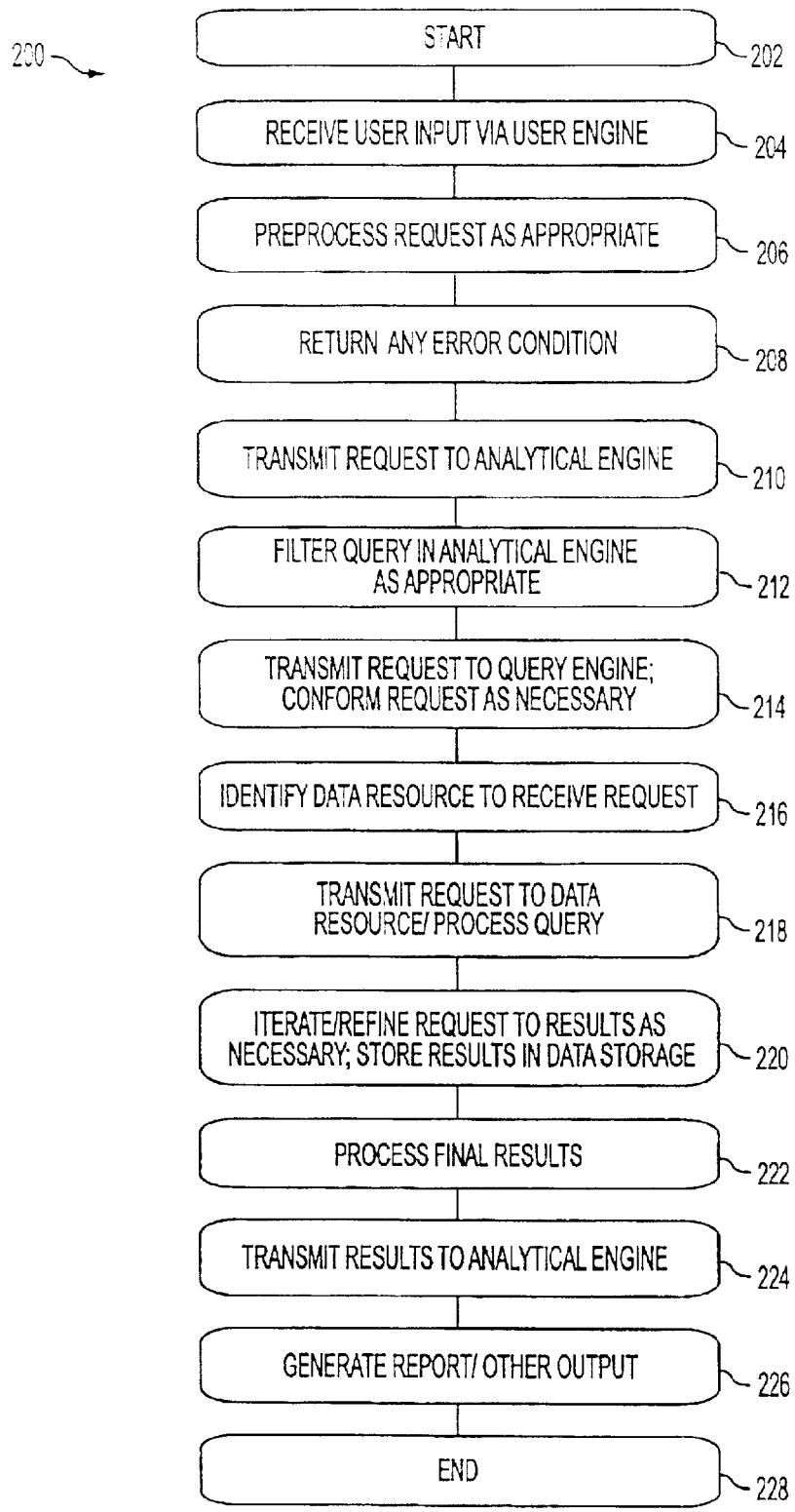
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
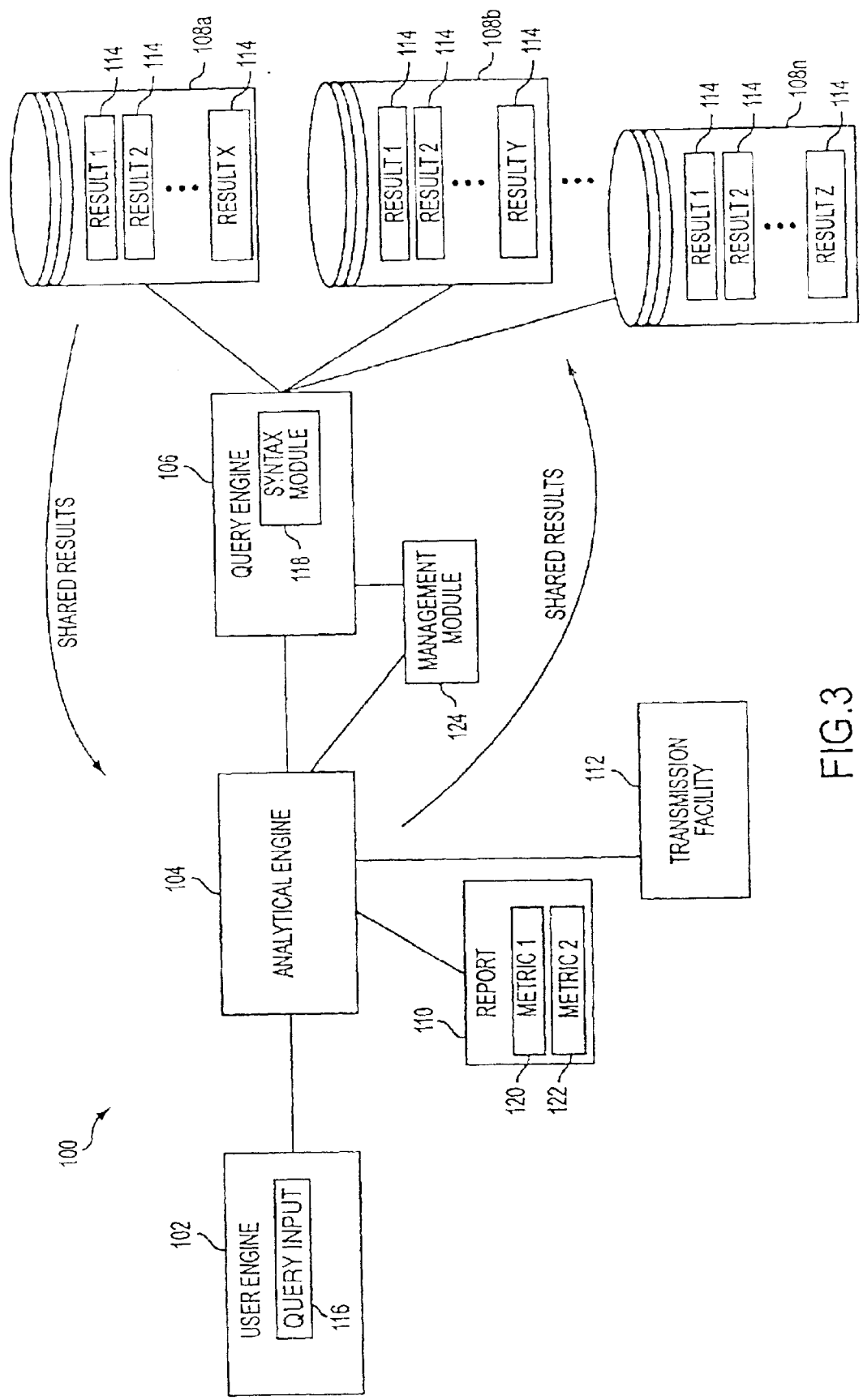
FIG. 3 is a block diagram illustrating an architecture for a system according to an embodiment of the invention.

In an embodiment of the invention illustrated in FIG. 3, the user may wish to generate a report 110 containing different types of metrics, illustrated as a first metric 120 and a second metric 122. The first metric 120 might illustratively be, for instance, an average or mean of a data set, such as sales or other data. The second metric 122 might illustratively be, for instance, a standard deviation or an analytical treatment, such as a regression or other analysis. In this illustrative embodiment, the first metric 120 may be computable by the data storage devices 108a, 108b . . . 108n and their associated hardware or by the analytic engine 104, whereas the second metric 122 may be computable by the analytic engine, only.

In this embodiment, a management module 124 may be invoked to manage the distribution of the computation of the report 110 including first metric 120 and second metric 122. For instance, the management module may maintain a table of computable functions, processes, routines and other executable treatments that the analytical engine 104, data storage devices 108a, 108b . . . 108n, query engine 106 and other resources in the network of the invention may perform. The management module 124 may then associate available resource with the necessary computations for the given report 110, including in this instance the first metric 120 and the second metric 122. The management module 124 may be configured to detect and place the computation of functions in the most efficient processing resource available at the time. For instance, the management module 124 may be configured to always or by default to compute functions that the data storage devices 108a, 108b . . . 108n are capable of computing within those devices.

In this illustrative embodiment, the management module 124 may detect the first metric 120 as being computable within the data devices 108a, 108b . . . 108n and direct the computation of that metric, such as an average or mean, therein. The management module 124 may likewise detect the second metric 122 as being computable by the analytic engine 104, and direct the computation of that metric, such as standard deviation or other metric, in that engine.

The management module 124 may also detect dependencies in the computation of the first metric 120, second metric 122 or other metrics necessary to the computation of the report 110. For instance, it may be the case that the first metric 120 is a necessary input to the computation of the second metric 122. In that instance, the management module 124 may defer the computation of the second metric 122 until the data storage devices 108a, 108b . . . 108n have completed the computation of the first metric 120. The first metric 120 may then be transmitted as intermediate results to the analytic engine 104, where that metric may be used to compute the second metric 122. To achieve the greatest efficiencies of computation and communication, any intermediate results of any computation may be temporarily stored or cached on the data storage devices 108a, 108b . . . 108n or other resources so that further computations need not re-compute or retrieve those intermediate data unnecessarily.

Likewise, when computations may be most efficiently performed by the data storage devices 108a, 108b . . . 108n and inputs from the analytic engine 104 may be needed for those computations, the analytic engine 104 may transmit (or "push") results to the data storage, 108a, 108b . . . 108n for combination and computation therein. Thus, according to the invention the analytic engine 104, the data storage devices 108a, 108b . . . 108n and other engines or resources of the network may act in concert to distribute processing to the necessary or most optimal node of the network, in a collaborative or cooperative fashion, rather then according to a one-directional processing flow where computations and results are merely retrieved (or "pulled") from the data storage devices 108a, 108b . . . 108n for downstream processing elsewhere. Iterative, stepwise or otherwise collaborative computations may thus be carried out, according to the invention.

Figure 4:
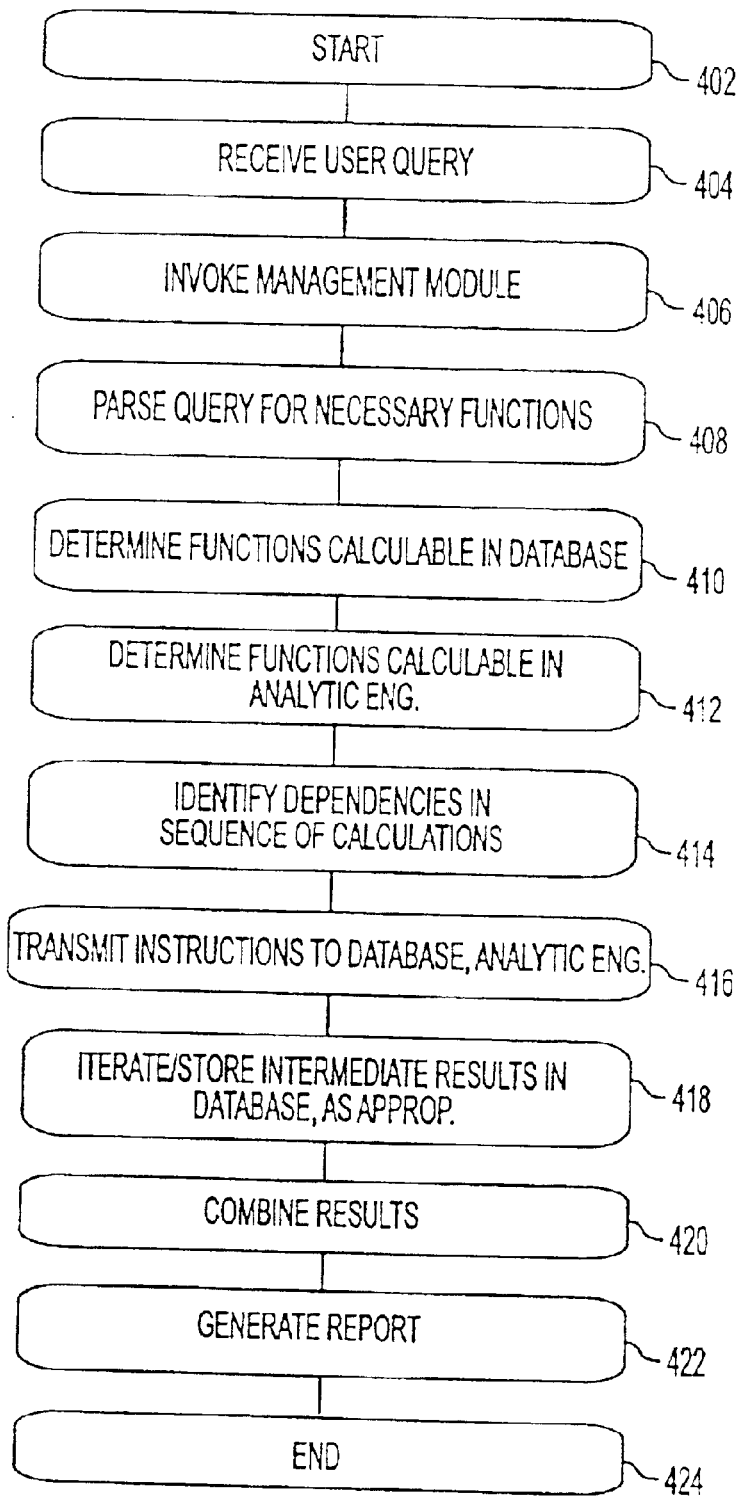
FIG. 4 is a flowchart illustrating steps performed by a process for distributed computation according to an embodiment of the invention.

Overall processing according to an embodiment of the invention for distributed function selection and processing is illustrated in FIG. 4. In step 402, processing begins. In step 404, a user query may be received to generate a desired report 110. In step 406, the management module 124 may be initiated or invoked. In step 408, the management module 124 or other resources may parse the query for necessary computations or functions to deliver the report 110.

In step 410, the management module 124 may determine which computations or functions may be computable in the data storage 108a, 108b . . . 108n or other resources. In step 412, the management module may determine which computations or functions may be computable in the analytic engine 104 or other resources. In step 414, the management module 124 may identify any dependencies in the order of computation needed to generate report 110.

In step 416, the management module 124 may transmit instructions, such as SQL or other commands, to the analytic engine 104, the data storage devices 108a, 108b . . . 108n to execute functions, computations or other processing of data from the data storage devices 108a, 108b . . . 108n and intermediate results in those distributed resources. Processing may be concurrent or sequential, as appropriate. In step 418, any intermediate results may be iterated or stored locally or temporarily for more efficient retrieval, such as in storage devices 108a, 108b . . . 108n or elsewhere. In step 420, the results of the computations from the various resources may be combined. In step 422, a report 110 may be generated containing the desired types of metrics, such as first metric 120 and second metric 122. In step 424, processing ends.

Figure 5:
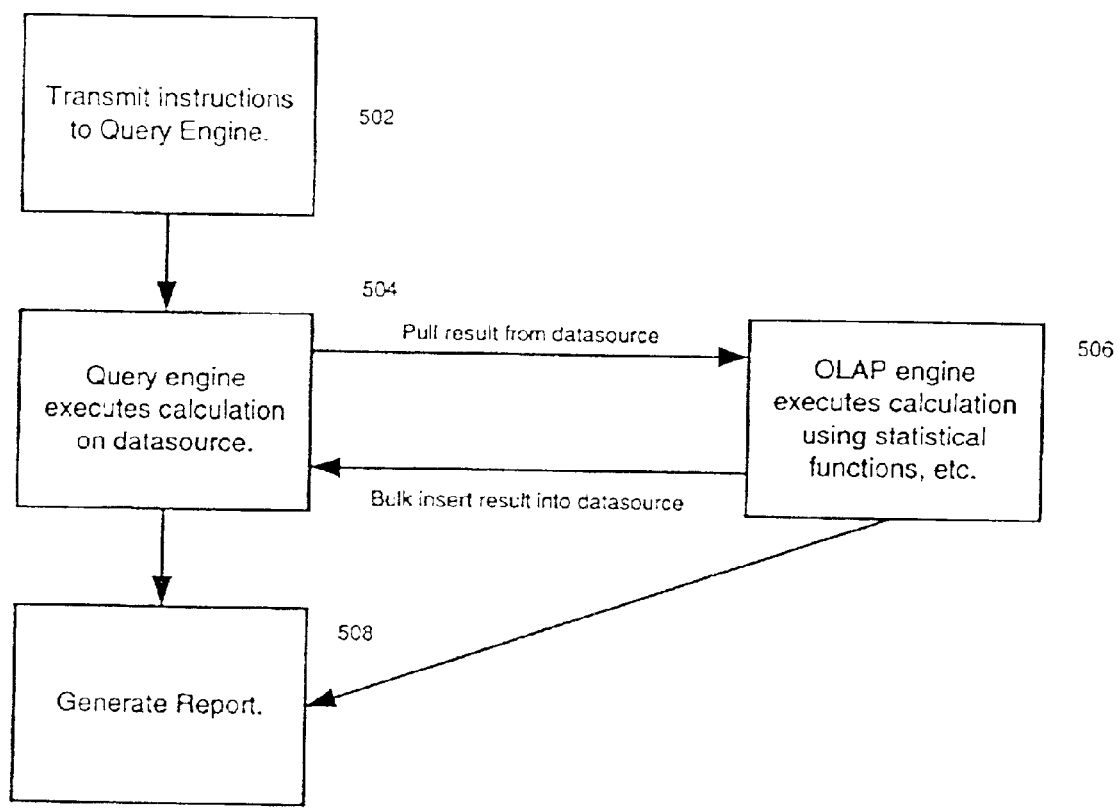
FIG. 5 is a flowchart illustrating steps performed during distributed processing according to an embodiment of the invention, in another regard.

Aspects of the iterated collaboration noted in step 418 of FIG. 4 described above are illustrated in the flowchart of FIG. 5. As shown in that figure, in step 502, instructions may be transmitted to the query engine 106, for instance as part of the generation of a report 110. In step 504, the query engine 106 may execute one or more calculation on the data storage devices, 108a, 108b . . . 108n. In step 506, the analytical engine 104 may extract the results of the one or more calculation from the data storage devices 108a, 108b . . . 108n and execute one or more calculations from its function set on those results, after which a bulk insert of the results from the analytical engine 104 into the data storage devices 108a, 108b . . . 108n may be performed. In step 508, a report 110 may be assembled or generated from the collaborative processing, and presented to the user or otherwise output.

The foregoing description of the invention is illustrative, and variations in configuration and implementation will occur to persons skilled in the art. For instance, resources illustrated as singular may be distributed amongst multiple resources, whereas resources illustrated as distributed may be combined, in embodiments. The scope of the invention is accordingly to be limited only by the following claims.

What is claimed is:

1. A system for collaborative processing, comprising:

a controlling module with access to at least one relational database capable of performing a first set of functions on the data in the database and at least one external analytical engine, the external analytical engine being external to the relational database and being capable of a second set of functions on the data in the database;

wherein the controlling module performs the following steps:

receiving a request to generate a report based on data in the relational database, the request including at least one multi-step calculation to be performed on data in the relational database;

generating a first SQL statement to resolve a first step of the multi-step calculation on first data in the relational database;

receiving results from the first SQL statement;

passing data generated by the first SQL statement to the external analytical engine, wherein the external analytical engine is directed to perform at least one operation on the data;

receiving externally-operated data from the external analytical engine after the at least one operation;

inserting the externally-operated data into a relational database;

generating a second SQL statement to resolve another step in the multi-step calculation, the second SQL statement operating on at least part of the first data and at least part of the externally-operated data; and generating a report in response to the request after the second SQL statement has been resolved.

2. The system of claim 1 wherein the externally-operated data is inserted into the at least one relational database in which the first data is stored.

3. The system of claim 1 wherein the externally-operated data is inserted into a second relational database different from the relational database in which the first data is stored.

4. The system of claim 1 wherein the controlling module performs the following additional steps:

receiving results from the second SQL statement;

passing data generated by the second SQL statement to the external analytical engine, wherein the external analytical engine is directed to perform at least one operation on the data;

receiving second externally-operated data from the external analytical engine after the at least one operation;

inserting the externally-operated data into a relational database; and generating a third SQL statement to resolve another step in the multi-step calculation, the third SQL statement operating on at least part of the first data and at least part of the second externally-operated data.

5. The system of claim 4 wherein the controlling module performs the receiving, passing, receiving, inserting and generating steps at least one additional time, thus generating a fourth SQL statement prior to generating the report result.

6. The system of claim 1 wherein the first SQL statement comprises a fetch operation.

7. The system of claim 1 wherein the fist SQL statement comprises a filtering operation.

8. The system of claim 1 wherein the first SQL statement comprises a calculation operation.

9. The system of claim 1 wherein the first SQL, statement comprises an aggregation operation.

10. The system of claim 1 wherein the operation performed by the external analytical engine is an operation that the at least one relational database is incapable of performing.

11. A method for collaborative processing in system with access to a relational database capable of performing a first set of functions on the data in the database and at least one external analytical engine, the external analytical engine being external to the relational database and being capable of a second set of functions on the data in the database, the method comprising the steps of:

receiving at a controlling module external to a relational database a request to generate a report based on data in the relational database, the request including at least one multi-step calculation to be performed on data in the relational database;

generating a first SQL statement to resolve a first step of the multi-step calculation on first data in the relational database;

receiving results from the first SQL statement;

passing data generated by the first SQL statement to the external analytical engine, wherein the external analytical engine is directed to perform at least one operation on the data;

receiving externally-operated data from the external analytical engine after the at least one operation;

inserting the externally-operated data into a relational database;

generating a second SQL statement to resolve another step in the multi-step calculation, the second SQL statement operating on at least part of the first data and at least part of the externally-operated data; and generating a report in response to the request after the second SQL statement has been resolved.

12. The method of claim 11 wherein the eternally-operated data is inserted into the at least one relational database in which the first data is stored.

13. The method of claim 11 wherein the eternally-operated data is inserted into a second relational database different from the relational database in which the first data is stored.

14. The method of claim 11 further comprising the steps of:

receiving results from the second SQL statement;

passing data generated by the second SQL statement to the external analytical engine, wherein the external analytical engine is directed to perform at least one operation on the data;

receiving second externally-operated data from the external analytical engine after the at least one operation;

inserting the externally-operated data into a relational database; and generating a third SQL statement to resolve another step in the multi-step calculation, the third SQL statement operating on at least part of the first data and at least part of the second externally-operated data.

15. The method of claim 14 wherein the receiving, passing, receiving, inserting and generating steps are performed at least one additional time, thus generating a fourth SQL statement prior to generating the report result.

16. The method of claim 11 wherein the first SQL statement comprises a fetch operation.

17. The method of claim 11 wherein the first SQL statement comprises a filtering operation.

18. The method of claim 11 wherein the first SQL statement comprises a calculation operation.

19. The method of claim 11 wherein the first SQL statement comprises an aggregation operation.

20. The method of claim 11 wherein the operation performed by the external analytical engine is an operation that the at least one relational database is incapable of performing.

21. A machine readable medium, the machine readable medium being readable to execute a method for collaborative processing, the method comprising:

receiving at a controlling module external to a relational database a request to generate a report based on data in the relational database, the request including at least one multi-step calculation to be performed on data in the relational database;

generating a first SQL statement to resolve a first step of the multi-step calculation on first data in the relational database;

receiving results from the first SQL statement;

passing data generated by the first SQL statement to the external analytical engine, wherein the external analytical engine is directed to perform at least one operation on the data;

receiving externally-operated data from the external analytical engine after the at least one operation;

inserting the externally-operated data into a relational database;

generated a second SQL statement to resolve another step in the multi-step calculation, the second SQL statement operating on at least part of the first data and at least part of the externally-operated data; and generating a report in response to the request after the second SQL statement has been resolved.

* * * * *